United States Patent
Dugas et al.

(10) Patent No.: US 7,532,435 B2
(45) Date of Patent: *May 12, 2009

(54) OPTICAL PATH FOR A THERMAL-ASSISTED MAGNETIC RECORDING HEAD

(75) Inventors: Matthew P. Dugas, St. Paul, MN (US); Jeffrey A. Wallhoff, New Brighton, MN (US)

(73) Assignee: Advanced Research Corporation, White Bear Lake, MN (US)

( * ) Notice: Subject to any disclaimer, the term of this patent is extended or adjusted under 35 U.S.C. 154(b) by 22 days.

This patent is subject to a terminal disclaimer.

(21) Appl. No.: 11/328,847

(22) Filed: Jan. 10, 2006

(65) Prior Publication Data

US 2007/0008659 A1    Jan. 11, 2007

Related U.S. Application Data

(63) Continuation of application No. 10/600,561, filed on Jun. 19, 2003, now Pat. No. 6,996,033.

(60) Provisional application No. 60/389,802, filed on Jun. 19, 2002, provisional application No. 60/413,190, filed on Sep. 24, 2002.

(51) Int. Cl.
  *G11B 5/127* (2006.01)
  *G11B 5/02* (2006.01)
(52) U.S. Cl. ............ 360/125.74; 360/125.31; 360/59
(58) Field of Classification Search ........... 360/126, 360/125.31–125.32, 125.74–125.75, 128, 360/59
See application file for complete search history.

(56) References Cited

U.S. PATENT DOCUMENTS

| | | | |
|---|---|---|---|
| 3,192,608 A | 7/1965 | Rinia et al. |
| 3,417,386 A | 12/1968 | Schneider |
| 3,699,334 A | 10/1972 | Cohen et al. |
| 4,298,899 A | 11/1981 | Argumedo et al. |
| 4,457,803 A | 7/1984 | Takigawa |
| 4,535,376 A | 8/1985 | Nomura et al. |
| 4,685,012 A | 8/1987 | De Wit et al. |
| 4,758,304 A | 7/1988 | McNeil et al. |
| 5,016,342 A | 5/1991 | Pisharody et al. |
| 5,035,787 A | 7/1991 | Parker et al. |

(Continued)

FOREIGN PATENT DOCUMENTS

| EP | 0913813 A2 | 5/1999 |
|---|---|---|
| JP | 4-91317 | 3/1992 |

OTHER PUBLICATIONS

Albrecht, Thomas et al., "Time-based, track-following servos for linear tape drives", Data Storage, Oct. 1997.

*Primary Examiner*—A. J. Heinz
(74) *Attorney, Agent, or Firm*—Dorsey & Whitney LLP; Nathan J. Witzany, Esq.

(57) ABSTRACT

An optical path or waveguide for a laser-assisted transducing head is disclosed. The optical path extends between the poles of the transducing head to near the write gap. A solid-state laser is attached to or incorporated into the slider or head and is positioned to direct thermal energy through a waveguide and onto a track of a read/write surface to lower the coercivity of the recording medium to facilitate the write process.

18 Claims, 9 Drawing Sheets

U.S. PATENT DOCUMENTS

| | | |
|---|---|---|
| 5,067,230 A | 11/1991 | Meunier et al. |
| 5,086,015 A | 2/1992 | Itoh et al. |
| 5,093,980 A | 3/1992 | Maurice et al. |
| 5,189,580 A | 2/1993 | Pishardy et al. |
| 5,211,734 A | 5/1993 | Yagami et al. |
| 5,301,418 A | 4/1994 | Dirne et al. |
| 5,402,295 A | 3/1995 | Suzuki et al. |
| 5,405,734 A | 4/1995 | Aita |
| 5,452,166 A | 9/1995 | Aylwin et al. |
| 5,567,333 A | 10/1996 | Hira et al. |
| 5,572,392 A | 11/1996 | Aboaf et al. |
| 5,639,509 A | 6/1997 | Schemmel |
| 5,652,015 A | 7/1997 | Aboaf et al. |
| 5,675,461 A | 10/1997 | Aylwin et al. |
| 5,677,011 A | 10/1997 | Hatakeyama |
| 5,689,384 A | 11/1997 | Albrecht et al. |
| 5,715,597 A | 2/1998 | Aylwin et al. |
| 5,719,730 A | 2/1998 | Chang et al. |
| 5,726,841 A | 3/1998 | Tong et al. |
| 5,737,826 A | 4/1998 | Slade et al. |
| 5,751,526 A | 5/1998 | Schemmel |
| 5,752,309 A | 5/1998 | Partee et al. |
| 5,822,159 A | 10/1998 | Fukuyama et al. |
| 5,831,792 A | 11/1998 | Ananth |
| 5,986,978 A | 11/1999 | Rottmayer et al. |
| 6,016,290 A | 1/2000 | Chen et al. |
| 6,130,863 A | 10/2000 | Wang et al. |
| 6,269,533 B2 | 8/2001 | Dugas |
| 6,404,706 B1 | 6/2002 | Stovall et al. |
| 6,496,328 B1 | 12/2002 | Dugas |
| 6,603,713 B1 | 8/2003 | Novotny et al. |
| 6,809,908 B1 | 10/2004 | Ito et al. |
| 6,996,033 B2 | 2/2006 | Dugas et al. |

OPTICAL PATH FOR A THERMAL-ASSISTED MAGNETIC RECORDING HEAD

CROSS-REFERENCE TO RELATED APPLICATION

This application is a continuation application of U.S. Ser. No. 10/600,561, filed Jun. 19, 2003, now U.S. Pat. No. 6,996,033, which is a non-provisional of U.S. Ser. No. 60/389,802 filed Jun. 19, 2002 and 60/413,190 filed Sep. 24, 2002; the subject matters of which are hereby incorporated by reference in their entirety.

STATEMENT REGARDING FEDERALLY SPONSORED RESEARCH OR DEVELOPMENT

This invention was made with United States Government support under Agreement No. 70NANB1H3056 awarded by the U.S. Department of Commerce, National Institute of Standards and Technology (NIST), Advanced Technology Program. The United States Government has certain rights in the invention.

FIELD OF THE INVENTION

This invention relates generally to magnetic recording heads, including a read element and a write element, for use in a data storage system such as a disk drive. More specifically, it relates to a path for an optical waveguide to carry thermal energy (e.g., light) to a location near the write portion of the magnetic recording head, to enable thermally-assisted writing.

BACKGROUND OF THE INVENTION

Typical disk drive systems include suspensions for supporting a transducing head over information tracks of a rotatable disk. Typically, suspensions include a load beam or suspension having a mounting region on a proximal end, a flexure or gimbal on a distal end, a relatively rigid region adjacent to the flexure, and a spring region between the mounting region and the rigid region. An air bearing slider which holds the transducing head is mounted to the flexure. The mounting region is typically attached to a base plate for mounting the load beam to an actuator arm. A motor which is controlled by a servo control system rotates the actuator arm to position the transducing head over the desired information tracks on the disk. This type of suspension may be used with both magnetic and non-magnetic disks.

FIG. 1 shows a top view of a known disk drive actuation system 10, for positioning a transducing head (not shown) over a track of a magnetic disk. The actuation system 10 includes, as shown from left to right in FIG. 1, a voice coil motor ("VCM") 12, an actuator arm 14, a load beam or suspension 16, a flexure 18, and a slider 20. The slider 20 is connected to the distal end of the suspension 16 by the flexure 18. The load beam 16 is connected to the actuator arm 14 which is coupled to the VCM 12.

As shown on the right-hand side of FIG. 1, the disk drive assembly includes a disk 22 having a multiplicity of tracks 24 which rotate about an axis 26. During operation of the disk drive assembly, the rotation of the disk 22 generates air movement which is encountered by the slider 20. This air movement acts to keep the slider 20 aloft a small distance above the surface of the disk 22 allowing the slider 20 to "fly" above the surface of the disk 22. Any wear associated with physical contact between the slider 20 and the disk 22 is thus minimized.

As shown in FIG. 2, the flexure 18 provides a spring connection between the slider 20 and the load beam 16. Flexure 18 is configured such that it allows the slider 20 to move in pitch and roll directions to compensate for fluctuations in the spinning surface of the disk 22. Many different types of flexures 18, also known as gimbals, are known to provide the spring connection allowing for pitch and roll movement of the slider 20 and can be used with the present invention.

The VCM 12 is selectively operated to move the actuator arm 14 around an axis 28 thereby moving the load beam 16 and positioning the transducing head carried by the slider 20 between tracks 24 of disk 22. Proper positioning of the transducing head is necessary for reading and writing of data on the concentric tracks 24 of the disk 22. For a disk 22 having a high density, however, the VCM 12 lacks sufficient resolution and frequency response to position the transducing head on the slider 20 over a selected track 24 of the disk 22. Therefore, a higher resolution microactuation system is often used.

The density of concentric data tracks on magnetic disks continues to increase (i.e., the size of data tracks and radial spacing between data tracks are decreasing). In addition, the linear density continues to increase, which in turn increases the area bit density in both directions and reduced the area per magnetic bet cell. As the area per bit cell is reduced, the number of grains or particles per bit cell is also reduced unless the grain size is also reduced. The signal-to-noise ratio is a function of the number of grains per bit cell, so as this density increases, it becomes more difficult to write data to the tracks without affecting adjacent tracks. One technique in the art for enabling precise data writing is to use thermally-assisted laser writing. This technique requires the presence of a thermal energy source, such as a light beam (e.g., a laser beam) at or near the location of the transducing head. This thermal energy source provides energy to the recording medium, which reduces the medium's coercivity to facilitate the write process.

Accordingly, there is a need in the art for an optical path or waveguide for directing light from a top surface of a slider down to a point near the write gap of the magnetic recording head. There is a further need for a system for directing a laser beam to a position near the transducing head and onto the recording medium.

BRIEF SUMMARY OF THE INVENTION

The present invention, in one embodiment, is a magnetic recording head for writing data onto a magnetic recording medium. The head includes a first pole and a second pole separated by a gap. A coil structure traverses through the gap, and a waveguide extends through the gap, in a plane distinct from the first pole plane and the second pole plane. A closure partially connects the first pole and the second pole near the back gap to decrease a magnetic reluctance and increase a write efficiency of the recording head.

Another embodiment of the present invention is a load beam assembly for transducing data with a concentric track of a magnetic recording medium. The assembly includes a slider including an air-bearing surface, and a transducing head mounted on a trailing face of the slider, the transducing head having a first pole and a second pole. The assembly further includes a light source attached near the trailing face, and a waveguide extending generally straight down from near an upper edge to near a lower edge of the trailing face, such that the waveguide is disposed in a distinct plane between the first and second poles.

Yet another embodiment of the present invention is a method of fabricating a head/load beam assembly for writing data to a concentric track of a magnetic recording medium. The method comprises providing a slider having an air bearing surface, forming a transducing head on a trailing edge of the slider, the transducing head including a pole having a split back gap, forming a waveguide on the trailing face of the slider, the waveguide extending through the split back gap, and mounting a laser source near the trailing edge of the slider.

While multiple embodiments are disclosed, still other embodiments of the present invention will become apparent to those skilled in the art from the following detailed description. As will be apparent, the invention is capable of modifications in various obvious aspects, all without departing from the spirit and scope of the present invention. Accordingly, the drawings and detailed description are to be regarded as illustrative in nature and not restrictive.

DETAILED DESCRIPTION

Figure 1:
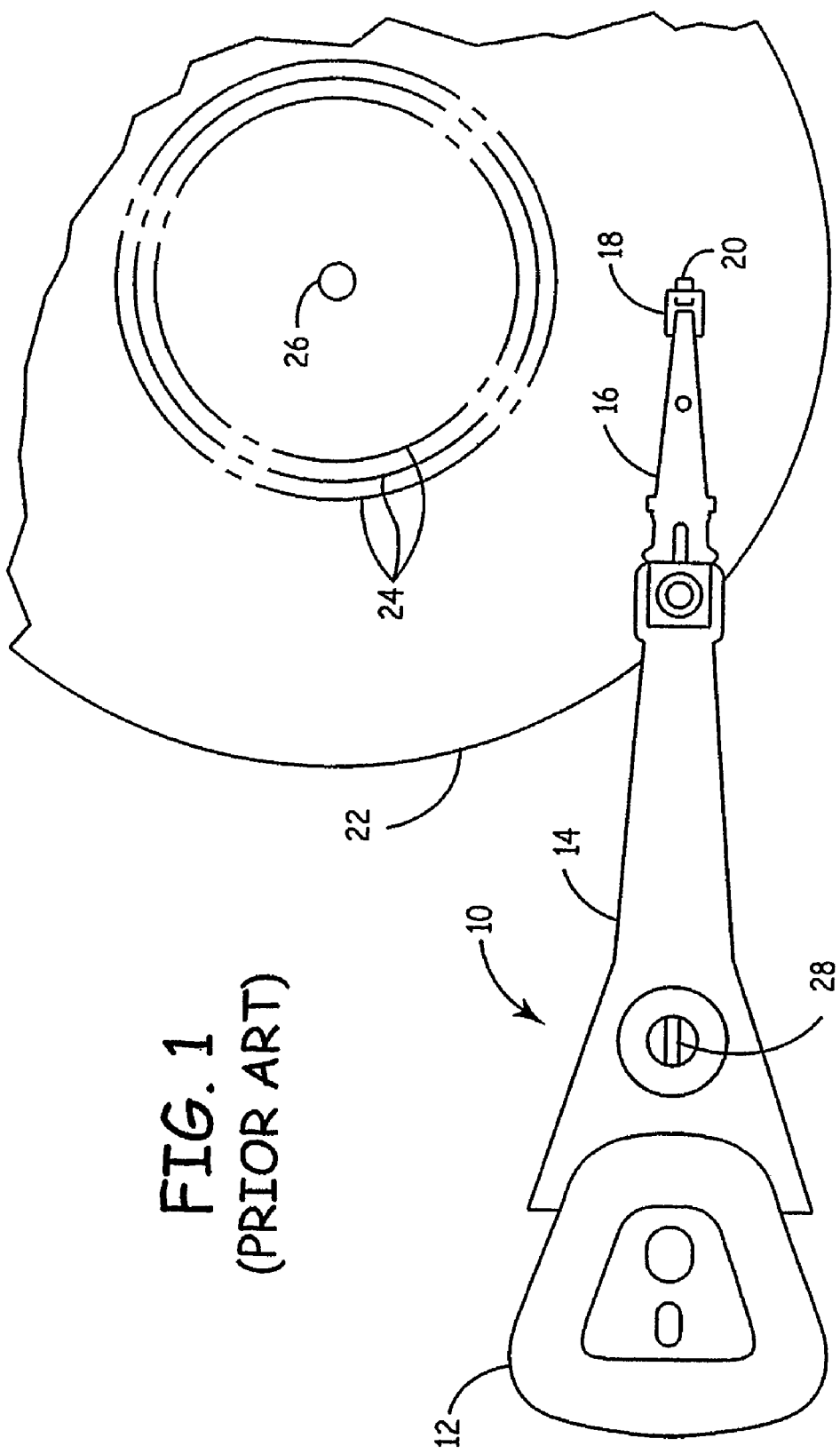
FIG. 1 is a top view of a disk drive actuation system, as known in the prior art.
Figure 2:
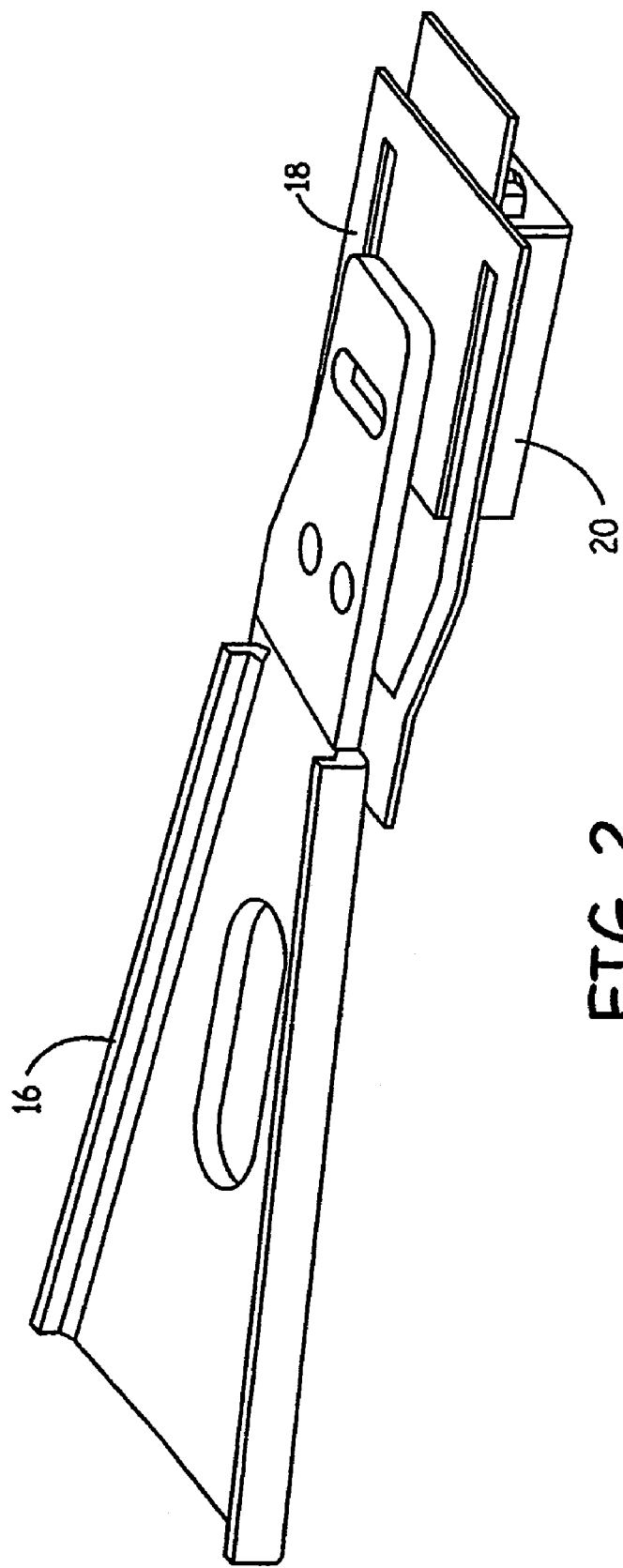
FIG. 2 is a perspective view of a suspension, flexure, and slider of a disk drive actuation and positioning system, as known in the prior art.
Figure 3:
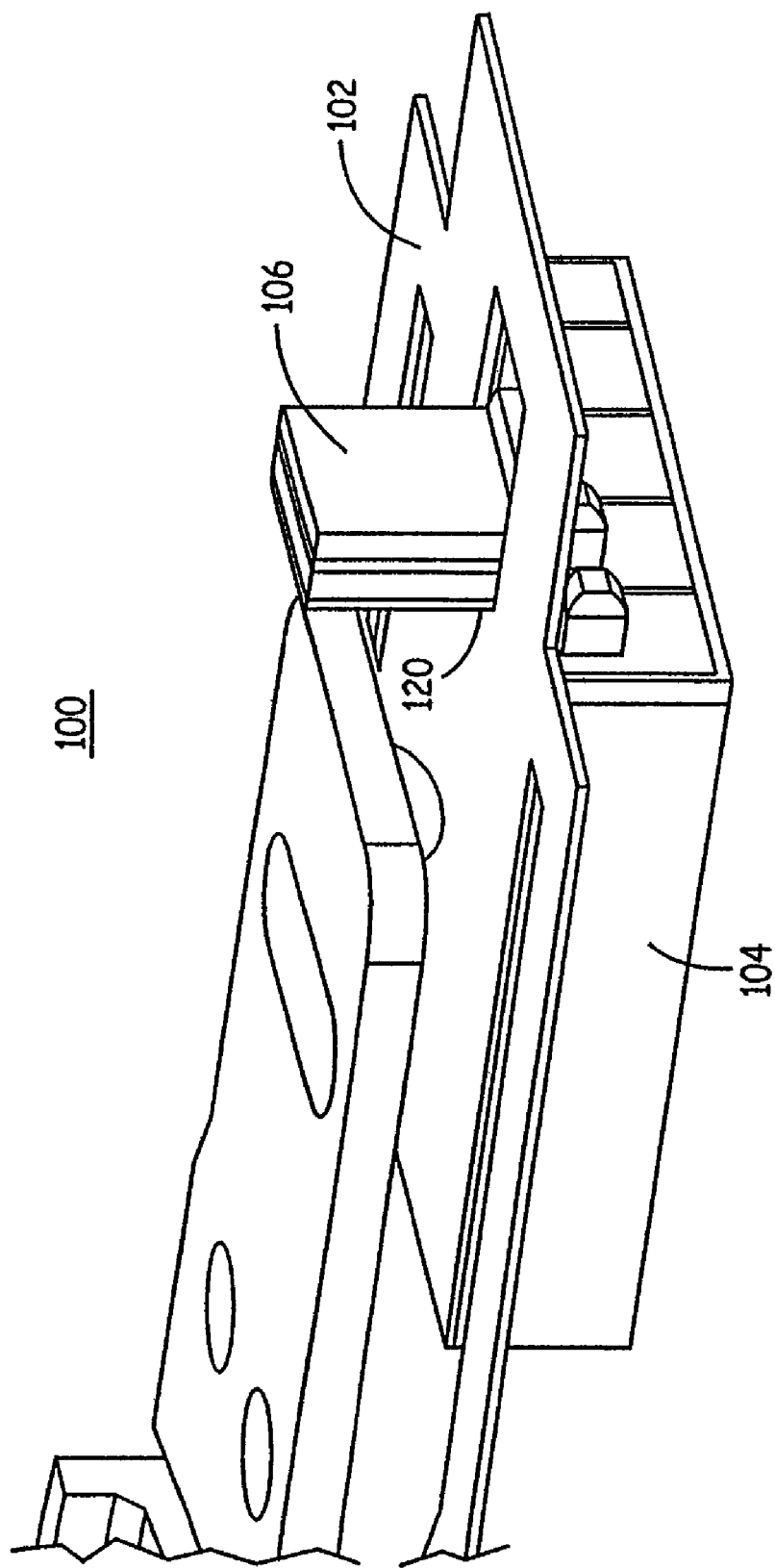
FIG. 3 is a perspective view of a head/gimbal assembly, according to one embodiment of the present invention.

FIG. 3 is a perspective view of a head/gimbal assembly 100, according to one embodiment of the present invention. As shown in FIG. 3, the head/gimbal assembly 100 includes a gimbal or flexure 102, a slider 104, and a laser 106. The assembly 100 can be mounted to any load beam known in the art. The laser 106, in the embodiment shown in FIG. 3, is butt coupled to the slider 104 in the manner discussed below with reference to FIG. 4A. As shown, the laser 106 is thermally-coupled to a tab 120, which extends upwardly from the flexure 102.

While the present invention is explained in terms of a laser, other thermal energy sources can replace the laser and fall within the scope of the invention. In one embodiment, the laser 106 is a laser diode, such as, for example, the 10 mW laser diode manufactured and sold by Semco Laser Technology of Baldwin Park, Calif. Any other laser diode known in the art may also be used in the present invention. In one embodiment, a laser diode having a power rating of from about 1 to about 25 mW is used. In another embodiment, a laser diode having a power rating of from about 8 to about 15 mW is used. In one embodiment, the laser provides sufficient power to heat the magnetic media to or above its Curie point. The laser diode may have an anode and a cathode for electrically coupling the laser diode to a power source.

Considerations for selecting and mounting the laser 106 include its power rating, ease of coupling to a waveguide, effect on slider flying characteristics, and thermal dissipation. The laser 106 should be able to generate sufficient power to reduce the coercivity of the recording medium. The laser 106 should be mounted to the flexure 102 in a manner that allows dissipation of heat. In the embodiment of FIG. 3, the laser 106 includes two heat transfer surfaces. One full face is in thermal contact with the tab 120 of the flexure 102 and another face is in thermal contact with the slider 104.

Figure 4A:
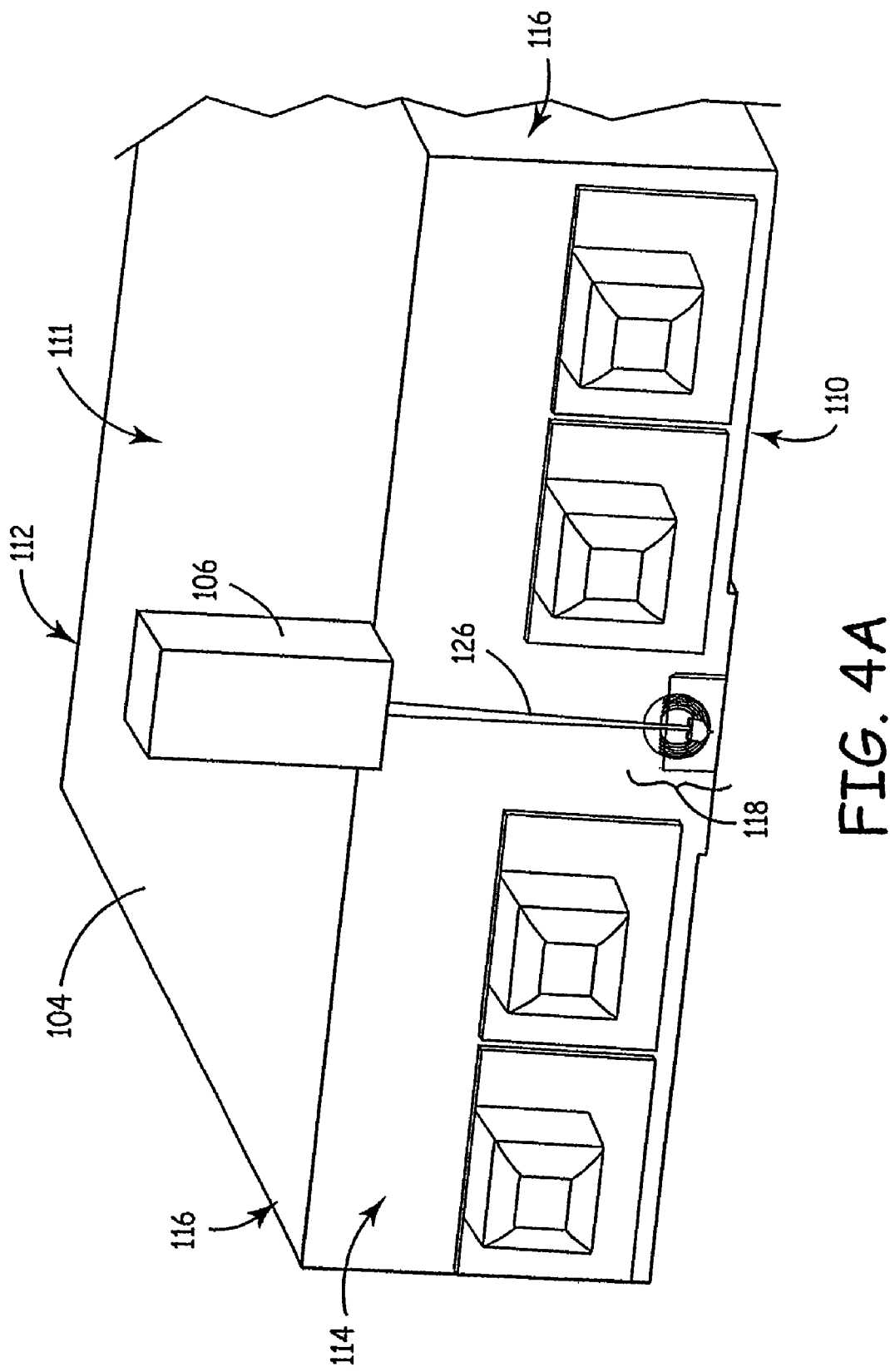
FIG. 4A is a perspective view of a laser-attached slider, according to one embodiment of the present invention.
Figure 4B:
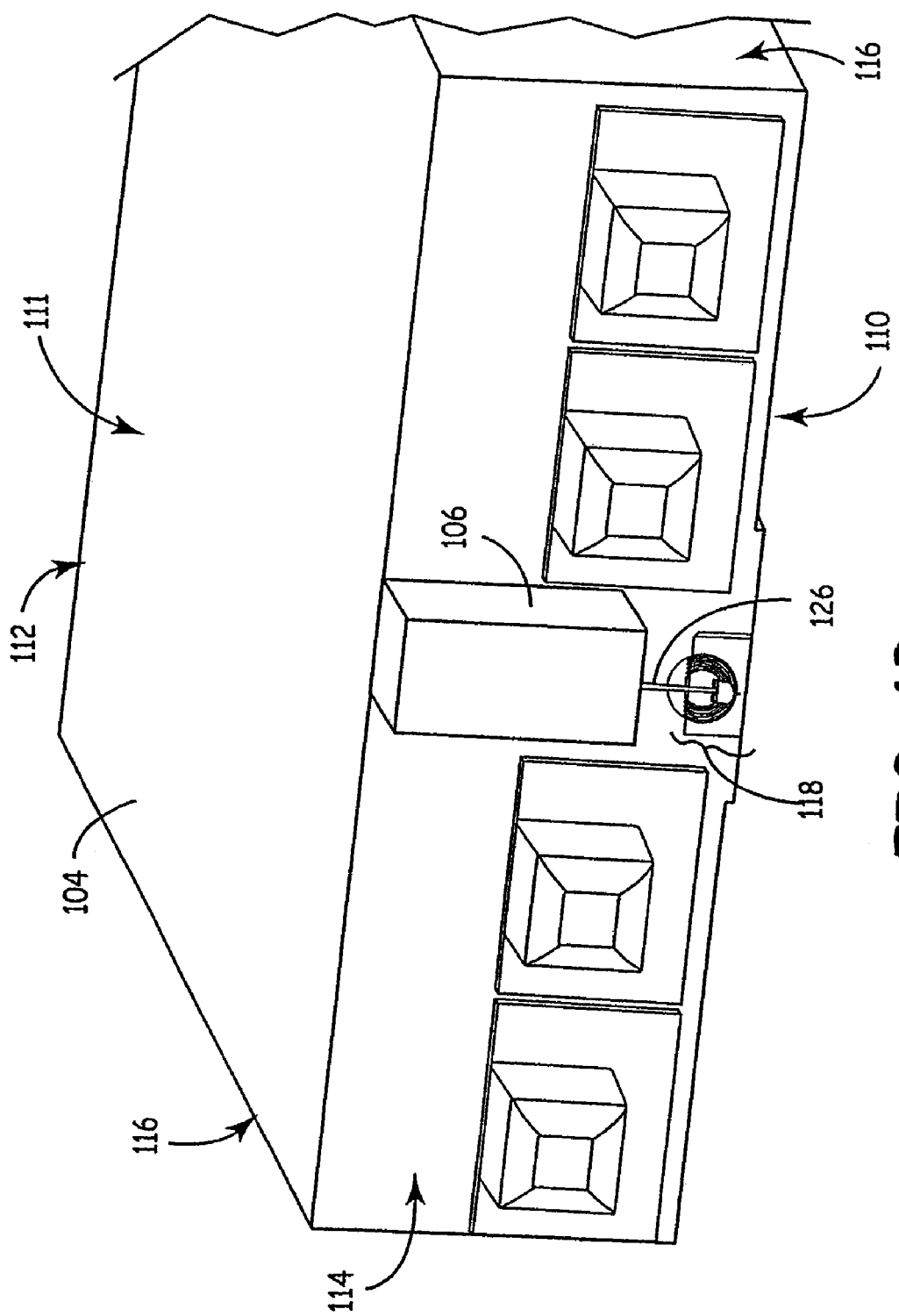
FIG. 4B is a perspective view of a laser-attached slider, according to a second embodiment of the present invention.

As shown in FIGS. 4A and 4B, a slider 104 includes a disk opposing face 110 and a top face 111 bounded by a leading face 112, a trailing face 114, and side faces 116 extending from the leading face 112 to the trailing face 114. The shape and contours of the disk opposing face 110 determine the flying characteristics of the slider 104. The slider 104 must maintain adequate roll, pitch, and normal stiffness over the concentric data tracks of the recording medium. FIGS. 4A and 4B further show the location of the transducing head 118, which is positioned on the trailing face 114 near the disk opposing face 110.

FIGS. 4A and 4B show embodiments in which the laser 106 is vertically disposed on the slider 104. In other words the laser 106 emits light directly into the entrance to the waveguide 126. The laser 106, in the embodiment shown in FIG. 4A is butt coupled to the top face 111 and secured with any known technique, including by use of an adhesive. As shown, the laser 106 is configured such that the light-emitting center portion of the laser 106 is aligned with the waveguide 126. Any known active alignment technique can be used to optimize alignment of the laser 106 with the waveguide 126. The top portion or entrance of the waveguide 126 includes an optical grading, which directs the light into the waveguide 126. In another embodiment, the laser 106 is free space coupled to the waveguide 126. In other words the laser 106 is mounted above the entrance of the waveguide 126 located on the slider 104.

In the embodiment of FIG. 4B, the laser 106 is mounted to the trailing face 114, which places one full face of the laser 106 in contact with the slider 104. In the embodiment shown, the laser 106 is set into a pocket formed in the trailing face 114 by a known technique such as ion milling. This configuration can provide additional stability and assist with proper alignment of the laser 106 with the waveguide 126. Again, active alignment can be used to optimize alignment of the laser 106 with the waveguide 126.

The waveguide 126 may be fabricated from any material known in the art capable of transmitting or conducting the laser beam from the laser source to a position near the write portion of the transducing head. The waveguide 126 is sized and shaped in any manner known in the art to conduct the laser beam effectively. The waveguide 126 may be constructed from one material or from multiple materials. The waveguide 126 can include one or more condensing or transducing elements to assist in directing the light to the write gap to effectively heat the magnetic media.

Figure 5A:
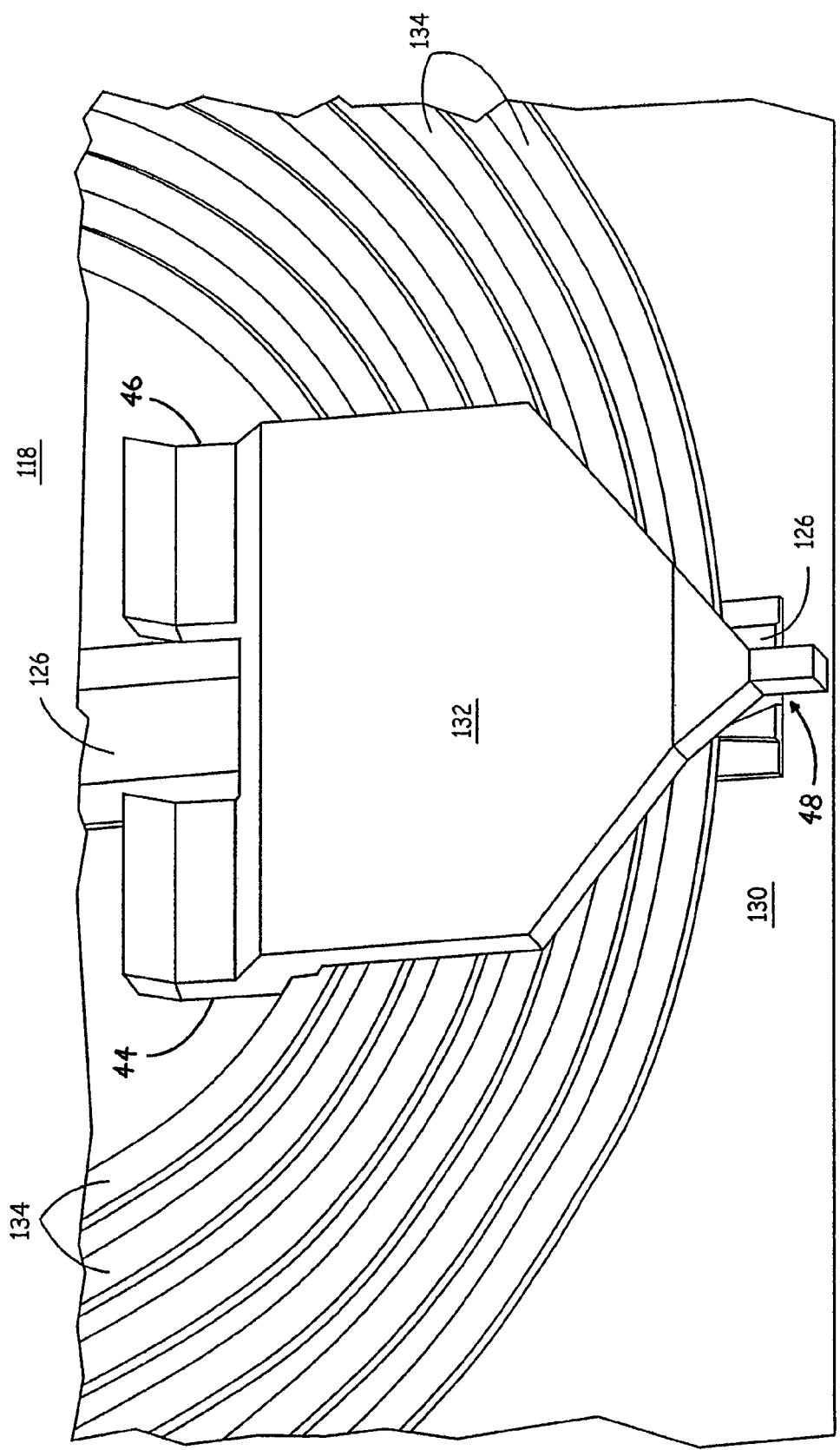
FIG. 5A is a perspective view of a transducing head, according to one embodiment of the present invention.
Figure 5B:
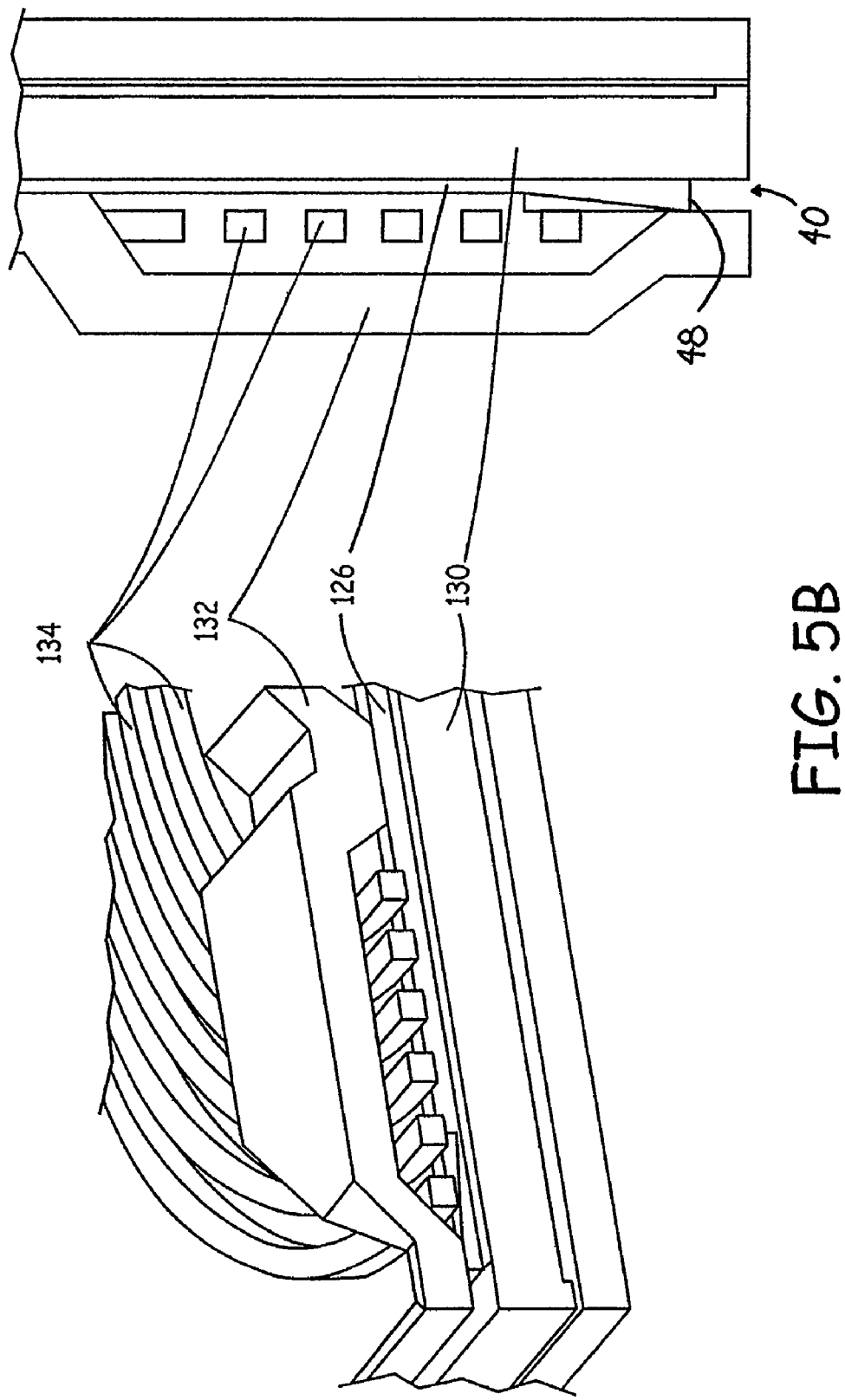
FIG. 5B is a sectional perspective view and cross-sectional view of a portion of a transducing head, according to one embodiment of the present invention.

FIGS. 5A and 5B show a perspective view and a sectional perspective view of a portion of the transducing head 118, according to one embodiment of the present invention. The transducing head 118 is formed near the lower edge of the trailing face of the slider 104. As shown in FIGS. 5A and 5B, the transducing head 118 includes a first pole 130, a second pole 132, and a read/write coil 134. An optical path or waveguide 126 extends from at or near the top face of the slider 104 to near the write gap 40. As shown, the waveguide 126, in this embodiment, extends along a front face of the first pole 130. The read/write coil 134 extends along a front face of the first pole 130 and behind the second pole 132. The read/ write coil 134 travels between the waveguide 126 and the second pole 132. The read/write coil 134 is insulated from the poles 130, 132 by an insulating layer.

As further shown in FIG. 5A, the second pole 132 includes a twin, or split, back gap through which the waveguide 126 travels. This configuration allows the waveguide 126 to extend to a point near the write gap 40 of the transducing head 118, without requiring any bending or turning of the waveguide 126. As shown in FIG. 5A, the second pole 132 includes a first closure 44 and a second closure 46. The closures 44, 46 act to strengthen the magnetic circuit conducted by the first pole 130 and the second pole 132, which reduces the magnetic reluctance and the power that must be supplied by the coil 134. This, in turn, increases the write efficiency of the head. Various other closed back gap configurations can also be used, which allow the waveguide 126 to travel to the distal end of the transducing head 118, without bending or turning. In one embodiment of the present invention, the closures 44, 46 are not present. In this open back gap configuration, the opposing pole areas must be sufficiently large to reduce the magnetic reluctance relative to the write gap 40. For example, in one embodiment the opposing area of the back gap is from about 10 to about 100 times larger than the opposing area of the write gap 40.

As shown in FIGS. 5A and 5B, the waveguide 126 terminates at a termination point 48 near a distal end of the transducing head 118. An optical condenser or transducer (not shown) is typically coupled to the termination point 48 of the waveguide 126 to direct the light into the write gap 40. According to another embodiment of the present invention, the waveguide 126 travels between the coil 134 and the second pole 132.

Figure 6:
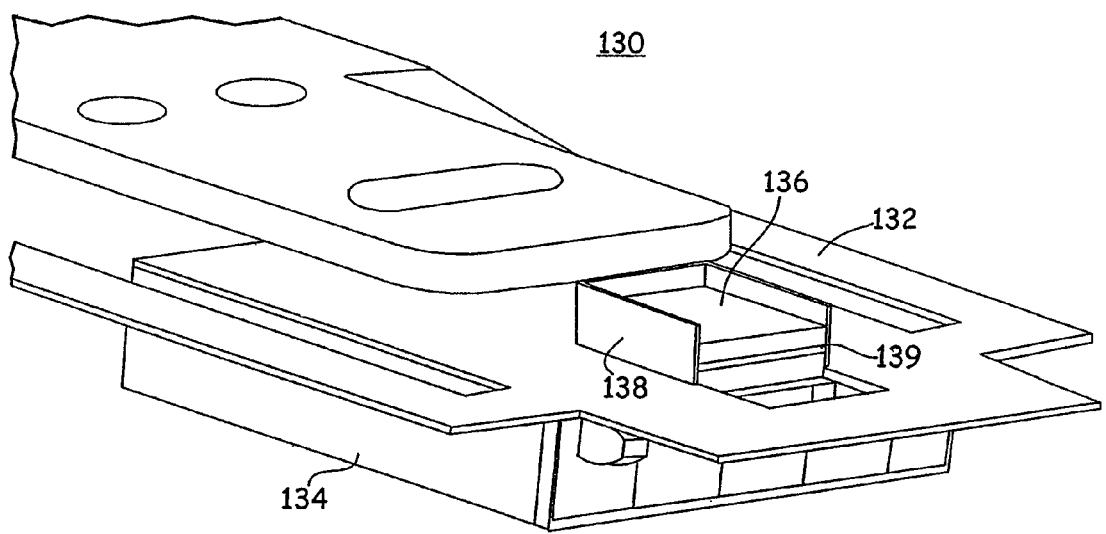
FIG. 6 is a perspective view of a head/gimbal assembly, according to another embodiment of the present invention.
Figure 7A:
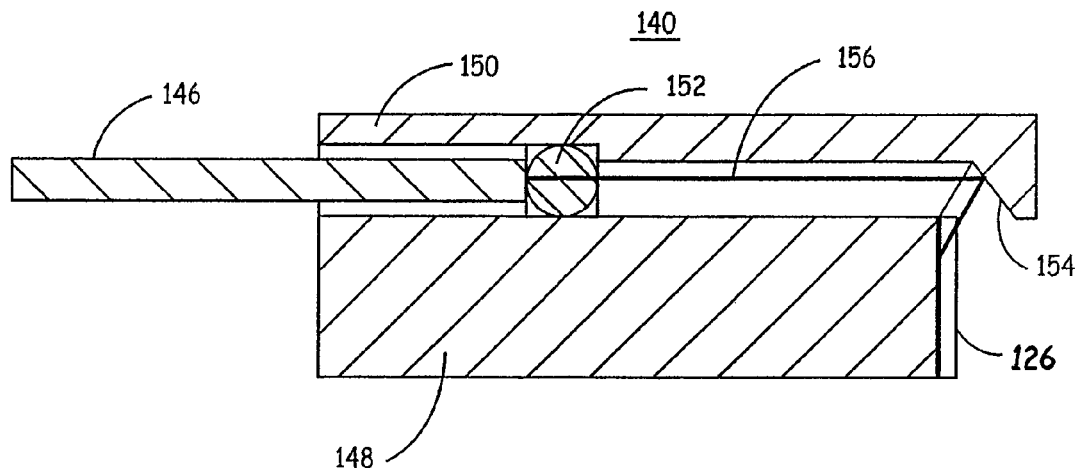
FIG. 7A is a sectional view and FIG. 7B is a sectional perspective view of a slider, according to yet another embodiment of the present invention.
Figure 7B:
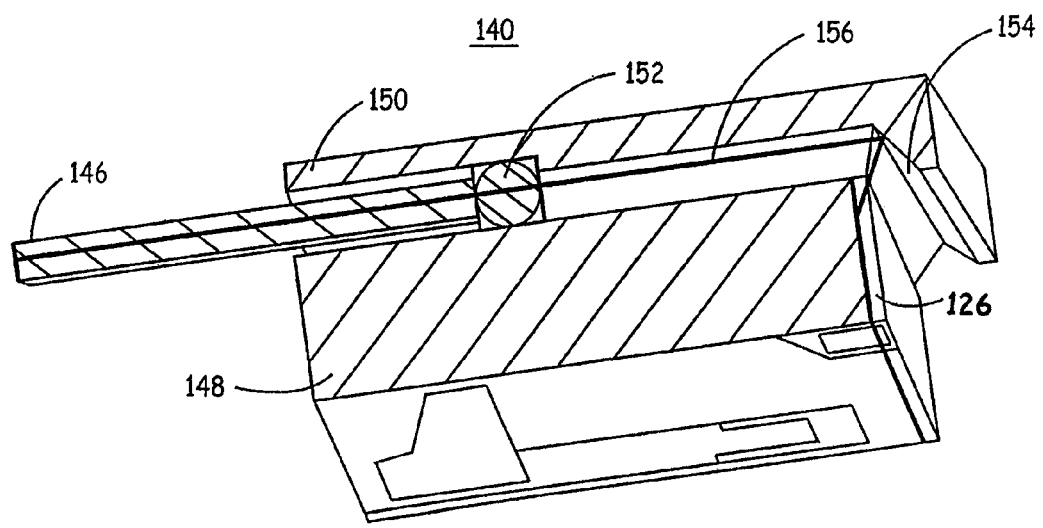

FIGS. 6, 7A, and 7B show various head/gimbal or load beam assemblies for mounting or coupling a laser source to the disclosed waveguide. FIG. 6 is a perspective view of a head/gimbal assembly 130, according to another embodiment of the present invention. As shown in FIG. 6, the head/gimbal assembly 130 includes a gimbal or flexure 132, a slider 134, and a laser source 136. The assembly 130 can be mounted to any load beam known in the art. As shown in FIG. 6, the assembly 130 further includes one or more tabs 138 projecting upward from the flexure 132. The tabs 138 may be integrally formed from the flexure 132 or may be coupled to the flexure 132. The embodiment shown in FIG. 6 includes four heat transfer surfaces to accomplish cooling of the laser source 136. In the embodiment of FIG. 6, the beam from the laser source 136 is turned ninety-degrees, using any known technique, to direct the beam in a direction generally perpendicular to the major plane of the slider 134. For example, a forty-five degree mirror 139 could be positioned between the output of the laser and the input of the waveguide.

FIG. 7A is a sectional view and FIG. 7B is a perspective view of a slider 140, according to yet another embodiment of the present invention. In this embodiment, the laser source (not shown) is located somewhere upstream (i.e., off board) from the slider 140 and the light from the laser source is carried to the slider 140 by an optical fiber 146. The assembly 140 can be mounted to a head/gimbal assembly, which can in turn be mounted to any load beam known in the art. The optical fiber 146 can be any fiber, as known in the art, capable of conducting the laser beam from the laser source to a location near the trailing edge of the slider 140. For example, the optical fiber 146, in one embodiment, is 80 micron RC SMF 28 Corning fiber or any other single-mode multi-mode fiber commercially available, including plastic optical fiber. In one embodiment, the optical fiber 146 could be covered with a protective coating or buffer.

As shown in FIGS. 7A and 7B, the slider 140 includes a slider base 148 and a top 150. A focusing ball 152 is located adjacent a distal end of the optical fiber 146 and focuses light exiting the optical fiber 146 toward a forty-five degree coupling surface or mirror 154. The coupling mirror 154 directs the light beam 156 into the entrance to the waveguide 126. Again, the entrance to the waveguide 126 includes an optical grading that collects light and focuses it along the waveguide 126. This structure is also commonly referred to as a silicon optical bench.

Although the present invention has been described with reference to preferred embodiments, persons skilled in the art will recognize that changes may be made in form and detail without departing from the spirit and scope of the invention.

We claim:

1. A head/load beam assembly for transducing data with a concentric track of a magnetic recording medium, the assembly comprising:
    a slider including an air-bearing surface;
    a transducing head mounted on a trailing face of the slider, the transducing head having a first pole and a second pole separated by a gap;
    a closure partially connecting the first pole and the second pole generally at the back of the first pole and the second pole, the closure including a first closure and a second closure split apart from each other; and
    a waveguide disposed in a distinct plane between the first and second poles and extending within the gap and between the first and second closures without bending, turning, or extending within the first pole or the second pole so as to decrease a magnetic reluctance and increase a write efficiency of the transducing head.

2. The assembly of claim 1 wherein a light source is attached near the trailing face.

3. The assembly of claim 2 wherein the light source includes a light emitting face, and wherein the light emitting face is disposed generally opposing an upper face of the slider.

4. The assembly of claim 2 wherein a power output of the light source is sufficient to cause heating of a portion of the magnetic recording medium located near a write gap to a Curie temperature of the magnetic recording medium.

5. The assembly of claim 2 further including a flexure adapted for supporting the slider and the light source.

6. The assembly of claim 1 wherein the transducing head further includes a transducing coil, the transducing coil extending between the first and the second poles.

7. The assembly of claim 1 wherein a light source is attached to the trailing face, such that a face of the light source is in contact with the trailing face.

8. A process of writing data onto a magnetic recording medium comprising:
    writing data onto the magnetic recording medium using a magnetic recording head comprising:
        a first pole and a second pole separated by a gap;
        a coil structure traversing through the gap;
        a waveguide extending through and within the gap, in a plane distinct from the first pole and the second pole; and
        a closure partially connecting the first pole and the second pole disposed proximate a back of the first pole and the second pole, the closure including a first closure and a second closure split apart from each other;

wherein the waveguide extends between the first and second closures without bending, turning, or extending within the first pole or the second pole so as to decrease a magnetic reluctance and increase a write efficiency of the recording head;

directing thermal energy through the waveguide to provide thermally-assisted writing.

9. The process of writing data onto a magnetic recording medium of claim 8, wherein the waveguide travels through a split gap between the first closure and the second closure such that the thermal energy can travel in a straight path from an entrance of the waveguide to a write gap area of the head.

10. The process of writing data onto a magnetic recording medium of claim 9, wherein the thermal energy is transduced onto the magnetic recording medium.

11. The process of writing data onto a magnetic recording medium of claim 8, wherein the waveguide is disposed between the first pole and the coil structure.

12. A process of writing data onto a magnetic recording medium comprising:

providing a load beam assembly comprising:

a slider including an air-bearing surface;

a transducing head mounted on a trailing face of the slider, the transducing head having a first pole and a second pole separated by a gap;

a closure partially connecting the first pole and the second pole generally at the back of the first pole and the second pole the closure including a first closure and a second closure split apart from each other; and a waveguide disposed in a distinct plane between the first and second poles and extending within the gap and between the first and second closures without bending, turning, or extending within the first pole or the second pole so as to decrease a magnetic reluctance and increase a write efficiency of the transducing head;

writing data onto the magnetic recording medium using the transducing head; and directing thermal energy through the waveguide to provide thermally-assisted writing.

13. The process of writing data onto a magnetic recording medium of claim 12, wherein a light source is attached near the trailing face.

14. The process of writing data onto a magnetic recording medium of claim 13, wherein the light source includes a light emitting face, and wherein the light emitting face is disposed generally opposing an upper face of the slider.

15. The process of writing data onto a magnetic recording medium of claim 13, wherein a power output of the light source is sufficient to cause heating of a portion of the magnetic recording medium located near a write gap to a Curie temperature of the magnetic recording medium.

16. The process of writing data onto a magnetic recording medium of claim 13, further including a flexure adapted for supporting the slider and the light source.

17. The process of writing data onto a magnetic recording medium of claim 12, wherein a light source is attached to the trailing face, such that a face of the light source is in contact with the trailing face.

18. The process of writing data onto a magnetic recording medium of claim 12, wherein the transducing head further includes a transducing coil, the transducing coil extending between the first and the second poles.

* * * * *